United States Patent [19]
Campbell et al.

[11] Patent Number: 5,338,561
[45] Date of Patent: Aug. 16, 1994

[54] WATER-CONTINUOUS EMULSIONS BASED ON POLYSACCHARIDES

[75] Inventors: Iain J. Campbell; Wayne G. Morley, both of Wellingborough; Ian T. Norton, Rushden, all of Great Britain

[73] Assignee: Van Den Bergh Foods Co., Division of Conopco, Inc., Lisle, Ill.

[21] Appl. No.: 23,183

[22] Filed: Feb. 25, 1993

[30] Foreign Application Priority Data

Feb. 26, 1992 [EP] European Pat. Off. ........ 92301629.9

[51] Int. Cl.$^5$ .............................................. A23D 7/00
[52] U.S. Cl. .................................... 426/602; 426/573; 426/575; 426/604; 426/613
[58] Field of Search ............... 426/602, 573, 575, 604, 426/613

[56] References Cited

U.S. PATENT DOCUMENTS

| | | | |
|---|---|---|---|
| 4,375,512 | 3/1983 | Richmon | 435/104 |
| 4,917,915 | 4/1990 | Cain et al. | 426/602 |
| 5,082,684 | 1/1992 | Fung | 426/602 |
| 5,190,781 | 3/1993 | Van Heteren | 426/602 |

FOREIGN PATENT DOCUMENTS

| | | |
|---|---|---|
| 291228 | 11/1988 | European Pat. Off. . |
| 355908 | 2/1990 | European Pat. Off. . |
| 432835 | 6/1991 | European Pat. Off. . |
| 455288 | 6/1991 | European Pat. Off. . |
| 463688 | 2/1992 | European Pat. Off. . |
| 483896 | 6/1992 | European Pat. Off. . |

OTHER PUBLICATIONS

Copending appl'n: Campbell Ser No. 07/07/967,370–corresponding to EP 91/310,097.
Copending appl'n: Campbell–Ser. No. 07/971,529 corresponding to EP 91/310,098.
European Search Report & Annex.

*Primary Examiner*—Helen Pratt
*Attorney, Agent, or Firm*—A. Kate Huffman

[57] ABSTRACT

The invention concerns water-continuous emulsions having a fat content of 1–60 wt. %, and wherein the aqueous phase consists of a gelling polysaccharide capable of forming a gel while the shear modulus of the aqueous phase must fulfil specific requirements and while the gelling polysaccharides are present as microgels with a mean equivalent diameter of less than 100 μm.

The emulsion is spoonable, meaning that it fulfils specific requirements as to yield value, Bingham viscosity and failure to stress.

The emulsions can be used in non-dairy creams, in dressings and mayonnaises.

14 Claims, No Drawings

WATER-CONTINUOUS EMULSIONS BASED ON POLYSACCHARIDES

Liquid-based compositions comprising at least one gelling polysaccharide capable of forming a gel, wherein the composition, at temperature T, is fluid and the shear modulus of the composition, at temperature T, is three or more times lower than the shear modulus of the gel obtained either after heating said composition to above the transition temperature and subsequent cooling or after chemically setting of the gelling agent, under quiescent conditions at the same temperature T. The gelling polysaccharide(s) predominantly being present in the composition as microgels having a mean equivalent diameter of less than 100 μm, more preferably of less than 50 μm. Microgels of this type are known from our U.S. patent application Ser. Nos. 07/34,466 and 07/627,148, both abandoned.

Furthermore, it is disclosed that these compositions are pourable and pumpable and that they disrupt at low strain. A method for the preparation of these compositions is also disclosed in these documents.

It is further disclosed that these compositions can be applied in edible, water-continuous fat emulsions. However, application of these compositions in food products that are spoonable, is not disclosed in these earlier Unilever patent applications.

We have now found that these compositions are very helpful in the preparation of water-continuous fat emulsions with the desired rheology in order to make them eminently spoonable.

Spoonable emulsions are defined in our earlier U.S. applications to Campbell et al. U.S. Ser. No. 967,370 and Campbell et al. U.S. Ser. No. 971,529, both now abandoned, as follows. A spoonable cream should display the following rheological behavior at 5° C.:

1) the yield value (also called: yield stress) should be more than 50 Pa extrapolated from shear rates between 100–300 $S^{-1}$ (Bingham);
2) the Bingham viscosity should be less than 500 mPas between shear rates of 100–300 $S^{-1}$; and
3) the failure to stress should occur at a strain of less than 0.5 Radians, preferably less than 0.1 Radians.

Yield values and Bingham viscosities were determined utilizing the Carrimed Rheometer. Measurements were performed at 5° C., using 4° cone and plate geometry. The shear stress was increased from zero at a rate of 60 Pa/min, and shear rates were measured until values in excess of 600 $S^{-1}$ were achieved. The experiment was then terminated. A graph of shear stress vs shear rate was plotted, and a straight line fitted to the curve between the shear rates of 100–300 $S^{-1}$. The slope of this line was the Bingham viscosity. The yield stress was determined by extrapolation of this line back to zero shear rate.

The failure to stress measurements were determined utilizing the Carrimed Rheometer. Measurements were performed at 5° C., using a 4° cone and plate geometry. The experiments performed were torque sweeps in oscillation mode. The samples were oscillated at a frequency of 1 Hz, as the torque was increased from 500–5000 μNm in thirty steps. The measurement time at each torque value was 10 sec, and the time between measurements was 5 sec. The parameters measured were storage modulus ($G^I$), loss modulus ($G^{II}$) and strain (in radians). A graph of $G^I$ and $G^{II}$ vs strain was then plotted. At low strain values the samples displayed solid-like characteristics, and $G^I > G^{II}$. At higher strain values $G^{II} > G^I$ and the failure to stress was defined as the strain at which $G^I = G^{II}$.

Therefore, our invention concerns water-continuous emulsions, wherein the above-mentioned liquid-based compositions comprising a gelling polysaccharide are present and which display excellent spoonable characteristics.

Thus, our invention is concerned with a water-continuous emulsion, which optionally contains protein component(s), emulsifier(s) and/or thickener(s), wherein the fat phase comprises 1–60 wt. % of the total composition and the aqueous phase consists of at least one gelling polysaccharide capable of forming a gel, wherein the aqueous phase, at temperature T, is fluid and wherein the aqueous phase, at temperature T, has a shear modulus that is at least three times as low as the shear modulus of the gel obtained, under quiescent conditions at the same temperature T, while the gelling polysaccharides are present as microgels with a mean equivalent diameter of less than 100 μm and the emulsion is spoonable, according to our definition for spoonable.

The water phase can be obtained either by shearing of the polysaccharides, using a specific heating regime or by chemically setting of the polysaccharides under shear.

Therefore, our invention is concerned with water-continuous fat emulsions wherein the aqueous phase consists of at least one gelling polysaccharide capable of forming a reversible gel and wherein the aqueous phase, at temperature T, has a shear modulus that is at least three times as low as the shear modulus of the gel obtained after heating said composition to above the transition temperature and subsequent cooling under quiescent conditions to the same temperature T.

Further, our invention concerns fat emulsions wherein the aqueous phase consists of at least one chemically set gelling polysaccharide capable of forming a gel and wherein the aqueous phase, at temperature T, has a shear modulus that is at least three times as low as the shear modulus obtained under quiescent conditions.

Definitions for transition temperature, gel melting point, mean equivalent diameter, shear modulus, gel setting point, and methods for measuring these parameters can be found in our earlier U.S. application Ser. No. 07/394,466. These definitions and methods are as follows:

The transition temperature of a particular composition is the temperature at which, upon slow temperature increase, the ordered form, be it of microscopical or macroscopical size, has disappeared completely. The transition temperature can be measured by means of differential scanning calorimetry. The transition temperature of the present composition can be somewhat higher than its gel melting point.

The gel melting point of the present composition can be determined by measuring the melting point of a gel, containing exactly the same ingredients, obtained by cooling under quiescent conditions. By cooling under quiescent conditions is to be understood cooling in the absence of any agitation. Here the term agitation encompasses actions such as shearing, stirring and shaking.

The melting temperature of a gel can suitable be measured using the following procedure: Pour a sample into a glass test tube and allow it to set fully at 5° C. Then place the tube in a water jacket connected to a programmable water bath. Place a steel ball, having a diameter of approximately 1 ram, on the surface of the sample and depress slightly in order to minimize surface tension effects. Equilibrate for one hour at 25° C., or a lower temperature in case of a low melting gel, and then apply a heating regime of 0.05° C./min. The gel melting point is the temperature at which the ball begins to sink through the sample. Movement of the ball can be observed using a travelling microscope. Methods and compounds for the preparation of chemically set polysaccharides can be found in U.S. application Ser. No. 07/627,148 and are as follows:

A liquid containing a chemically setting gelling agent is sheared while gelation is effected. The liquid containing the gelling agent is chemically set, whilst subjecting said liquid to sufficient shear to obtain a substantially less rigid composition than would have been obtained by chemically setting the liquid under quiescent conditions, on the understanding that if the gelling agent is sodium alginate, the gelling agent is chemically set at a temperature above 30° C. A smooth disruption at low strain of the composition is essentially different from the fracturing observed when rigid gels are subjected to conditions of strain. The disruption at low strain (e.g. rubbing or mastication) imparts a very smooth fat-like consistency. Due to its fat-like rheology the present fluid composition can suitable be used as a fat substitute. Accordingly the fluid composition can suitably be used to prepare 0% fat spreads or water-continuous low fat spreads.

A liquid is chemically set by allowing the gelling agent to form a salt with an effective cation. The latter may be effected, for instance, by adding said effective cation to the liquid containing the gelling agent or alternatively by converting a precursor-compound, present in the liquid containing the gelling agent, into the effective cation. The cation utilized in the present process, preferably, is selected from the group consisting of $Ca^{2+}$, $K^+$ and mixtures thereof. Most preferably the cation is $Ca^{2+}$.

A fluid composition containing a chemically setting gelling agent, at least part of which gelling agent has been chemically set, is obtained wherein the chemically set gelling agent is predominantly present as microgels having a mean equivalent diameter of less than 200 microns, preferably of less that 100 microns. Most preferably the microgels have an average equivalent diameter of less than 50 microns.

Definitions for yield value, Bingham viscosity and failure to stress and methods for measuring them can be found in P.Sherman, Emulsion Science, Academic Press, 1968, and in our U.S. patent application Ser No. 07/917,529, now abandoned and Ser. No. 07/967,370 and are discussed above. Additionally the term "stable" is defined as the cream can be stored for at least 14 days at a temperature of 0°-15° C., such that the rheology remains within the definition of spoonable, no serum leakage occurs, and the cream remains microbiologically stable.

Our new emulsions can be applied in non-dairy creams, dressings and mayonnaises.

The fat phase of our new emulsions represents in general 1-60 wt. % of the total emulsion. In non-dairy creams, a fat content of 2-40 wt. % is preferred; however, a fat content of 3-20 wt. % is most preferred, while in dressings and mayonnaises a fat content of 2-45 wt. % is preferred and 3-35 wt. % is most preferred. This means therefore that we have now found new food products that can have very low fat contents while their characteristics, such as mouthfeel, whipping time, theology, firmness and overrun, are excellent. Thus, we have found products that are healthier (because of the very low fat content) than known products, while their physical and organoleptic properties are about the same as the properties of known products. For example, whipping times of less than 6 minutes (using a Kenwood Electronic mixer model Km.201, 500 Watt, applying 180 rpm and a wire-whisk) are easily achievable.

The amount of gelling polysaccharide in the water phase can be 0.1-15 wt. %. The preferred amounts depend on the type of polysaccharide. For agar the preferred range is 0.2-5 wt. %; for carrageenan and furcellaran the preferred range is 0.5-10 wt. %.

The sheared polysaccharides that are suitably applied in the water phase of our emulsions can be chosen from the group consisting of agar, kappa-carrageenan, iota-carrageenan, pectin, alginate, gellan, furcellaran or mixtures thereof.

In order to impart a dairy character (i.e. dairy-like taste) to the emulsions, if required, incorporation of 2-10 wt. % of a protein component is preferred, in particular buttermilk powder or skimmed milk powder.

Although not always necessary, it is often advantageous to incorporate an emulsifer system into our emulsions. In this way, the whipping and spoonable properties of our products can be influenced. In principle, any known type of emulsifier can be used. Preferred emulsifiers, however, are monoglycerides of saturated and/or unsaturated fatty acids (in particular $C_{16}$-$C_{18}$ acids); polyoxyethylene sorbitan fatty acid esters; diacetyl tartaric esters of mono- or diglycerides (or the analogues without acetyl groups); lecithins; lactic acid esters of mono- and/or diglycerides or combinations thereof. The amount of emulsifier is usually 0.05-1.5 wt. %, in particular 0.1-0.8 wt. %.

It is also possible to control the theology of our emulsions to some extent by adding a thickener to the cream phase of our products. Suitable thickeners can be chosen from the group consisting of locust bean gum, xanthan gum, guar gum, sodium alginate, pectin or carrageenan or mixtures thereof. Note that these components of the cream phase are not sheared and are therefore different from the other components present in the water phase. Amounts of 0.05-1.5 wt. % of thickener, based on the product, lead to very acceptable results.

The emulsions according to the invention can be prepared by the following process:

1) a fluid composition containing at least one gelling polysaccharide is made by adding the polysaccharide to water, at a temperature above 60° C., subjecting this mixture to sufficient shear while cooling the liquid slowly through its gel setting temperature and collecting the composition, which displays a less rigid structure than the quiescently gelled composition;

2) a water-continuous fat emulsion is made, containing fat, protein, emulsifier and thickener;

3) the emulsion of 2) is homogenized under pressure (50-200 bar, single stage, preferably);

4) the compositions of 1) and 3) are mixed in a predetermined ratio.

Alternatively, the fluid composition of 1) may be kept at a temperature above 60° C. and mixed with the emulsion of 3) before cooling and shearing.

Similar processes can be performed by using a chemically set gelling agent (e.g. by $Ca^{2+}$-ions). In that case, the gelling polysaccharide is chemically set by addition of a chemically setting compound while shearing the fluid composition.

For the preparation of dressings or mayonnaises the above-mentioned processes are adapted in such a way that new dressings and mayonnaises are produced.

EXAMPLES

Spoonable creams were prepared by mixing an agar phase and a cream phase. The agar phase was made as follows:

| Agar (Gracilona ® 125) | 5% |
|---|---|
| Water | 95% |

1. The agar was dissolved in the water at 90° C. to give a 5 wt. % agar solution.
2. The solution was pumped through a micro-votator spreads line, in which the following conditions were applied:

| Unit | Speed (rpm.) | Exit T °C. |
|---|---|---|
| $A_1$ | 4,000 | 18.2 |
| $C_1$ | 4,000 | 10.5 |
| $A_2$ | 1,400 | 23.1 |
| $A_3$ | 1,400 | 8.9 |

The throughput was 56 g/min.
The cream phase was made up as follows:

| Hardened palmkernel oil | 24% |
|---|---|
| Coconut oil | 24% |
| BMP (butter milk powder) | 7% |
| Emulsifier | 0.6% |
| Thickener | 0.05% |
| Water | 44.35% |

1. BMP, emulsifier and thickener were dissolved in the water at 80° C.
2. The fat blend was mixed into the aqueous phase with the aid of a Silverson mixer.
3. The product of 2) was homogenized (single stage, 100 bar) and then rapidly cooled to 5° C.

This resulted in a 48% fat oil-in-water (o/w) emulsion.

Spoonable creams were made by carefully mixing a sample of the sheared 5% agar dispersion with a sample of the 48% fat o/w emulsion. Each resulting dispersion was stored overnight at 5° C. The rheological and whipping properties were as follows:

EXAMPLE 1

Formulation—188.1 g of sheared 5% agar dispersion
13.0 g of 48% fat o/w emulsion
Overall—4.7% agar and 3,1% fat on product
Extrapolated yield stress: 238 Pa
Bingham viscosity: 261 mPas
Failure to stress: 0,021 Radians

EXAMPLE 2

Formulation—161.8 g of sheared 5% agar dispersion
38.3 g of 48% fat o/w emulsion
Overall—4.0% agar and 9.2% fat on product
Extrapolated yield stress: 144 Pa
Bingham viscosity: 251 mPas
Failure to stress: 0,014 Radians 179 g were whipped on a Kenwood Chef at 180 rpm.
Whipping time: 4 min. 30 sec.
Overrun: 73%
Firmness (Boucher) 81

EXAMPLE 3

Formulation—126.2 g of sheared 5% agar dispersion
73.2 g of 48% fat o/w emulsion
Overall—3.2% agar and 17.6% fat on product
Extrapolated yield stress: 70 Pa
Bingham viscosity: 176 mPas
Failure to stress: 0.034 Radians
174 g were whipped on a Kenwood Chef at 180 rpm.
Whipping time: 3 min. 47 sec.
Overrun: 127%
Firmness (Boucher) 80

EXAMPLE 4

A 5% oil mayonnaise was prepared, using the sheared 5% agar dispersion, according to the following recipe:

| Recipe | |
|---|---|
| 4.7 wt % | agar |
| 5.0 wt % | sunflower oil |
| 0.13 wt % | K-sorbate |
| 1.5 wt % | NaCl |
| 0.002 wt % | dill aroma |
| 0.0005 wt % | lemon aroma |
| 1.2 wt % | mustard |
| | acetic acid to pH = 3.7 |
| trace β-carotene for color | |
| 87.4 wt % | water |

The aqueous agar-phase and the other components were mixed with a high speed mixer.
Results:
Extrapolated yield stress: 256 Pa
Bingham viscosity: 479 mPa.s
Failure to stress: 0.024 Radians

EXAMPLE 5

In a way similar to example 4 a mayonnaise was made, containing 30 wt. % oil.

| Recipe | |
|---|---|
| 3.5 wt % | agar |
| 30.0 wt % | sunflower oil |
| 0.13 wt % | K-sorbate |
| 1.5 wt % | NaCl |
| 0.002 wt % | dill aroma |
| 0.0005 wt % | lemon aroma |
| 1.2 wt % | mustard |
| | acetic acid to pH = 3.7 |
| trace β-carotene | |
| 63.7 wt % | water |

Results:
Extrapolated yield stress: 161 Pa
Bingham viscosity: 241 mPa.s
Failure to stress: 0,048 Radians

EXAMPLE 6

In a way similar to example 4 a dressing was made. The aqueous agar-phase was the same as applied in example 4.

| Recipe | |
|---|---|
| 2.0 wt % | agar |
| 0.13 wt % | K-sorbate |
| 1.1 wt % | NaCl |
| 7.8 wt % | mixed flavors (garlic; onion; mustard; black pepper) |
| 88.97 | water |
| | pH adjusted to 4.0 with acetic acid |

Results:
Extrapolated yield stress: 106 Pa
Bingham viscosity: 161 mPa.s
Failure to stress: 0.027 Radians

We claim:

1. A water-continuous fat emulsion comprising a fat phase comprising 1-60 wt % of the total composition;
an aqueous phase consisting of one or more gelling polysaccharide capable of forming a gel such that the aqueous phase at temperature T is fluid and has a shear modulus that is at least three times lower than a shear modulus of the gel obtained under quiescent conditions at the same temperature T,
the gelling polysaccharide being present as microgels with a mean equivalent diameter of less than 100 μm, and
the water-continuous fat emulsion displaying a spoonable rheology at 5° C. as follows:
a yield value of >50 Pa, when extrapolating from shear rates between 100 and 300 $S^{-1}$,
a Bingham viscosity <500 mPa.s between shear rates of between 100 and 300 $S^{-1}$,
a failure at stress at a strain of <0.5 Radians, and
a food component selected from a group consisting of a flavor, a salt, a colorant, an acid protein component, an emulsifier, a thickener and mixtures thereof.

2. Water-continuous emulsion according to claim 1, wherein the aqueous phase consists of at least one gelling polysaccharide capable of forming a reversible gel and wherein the aqueous phase, at temperature T, has a shear modulus that is at least three times as low as the shear modulus of the gel obtained after heating said composition to above the transition temperature and subsequent cooling under quiescent conditions to the same temperature T.

3. Water-continuous emulsion according to claim 1, wherein the aqueous phase consists of one or more chemically set gelling polysaccharide capable of forming a gel and wherein the aqueous phase, at temperature T, has a shear modulus that is at least three times as low as the shear modulus obtained under quiescent conditions.

4. Water-continuous emulsion according to claim 1, wherein the emulsion displays simultaneously a whipping time of less than 6 minutes using a Kenwood whipping apparatus.

5. Water-continuous emulsion according to claim 1, wherein the emulsion is a non-dairy cream with a fat content of 2-40 wt. %.

6. Water-continuous emulsion according to claim 5, wherein the composition contains 2-10 wt. % of a protein.

7. A water-continuous emulsion according to claim 6 wherein the protein is a butter milk powder or skimmed milk powder.

8. Water-continuous emulsion according to claim 1, wherein the emulsion is incorporated in a dressing or a mayonnaise and has a fat content of 2-45 wt. %.

9. Water-continuous emulsion according to claim 1, wherein the polysaccharide concentration of the water phase is 0.1-15 wt. %.

10. Water-continuous emulsion according to claim 1, wherein the polysaccharide is selected from the group consisting of agar, kappa-carrageenan, iota-carrageenan, gellan, furcellaran, pectin, alginate and mixtures thereof.

11. Water-continuous emulsion according to claim 1, wherein the thickener is present in an amount of 0.05-1.5 wt. % and is selected from the group consisting of locust bean gum, xanthan gum, guar gum, sodium alginate, pectin, carrageenan and mixtures thereof.

12. A water-continuous emulsion according to claim 1 wherein the emulsion is selected from a group consisting of monoglycerides of saturated fatty acids, unsaturated fatty acids, and mixtures of saturated and unsaturated fatty acids, polyoxyethylene sorbitan fatty acid esters, diacetyl tartaric esters of mono- or diglycerides, analogs of tartaric esters of mono- or diglycerides without acetyl groups, lecithins, lactic acid esters of mono-, di- and mixtures of mono- and diglycerides.

13. A water-continuous emulsion according to claim 12 wherein the emulsifier is present in an amount of 0.05-1.5 wt %.

14. A water-continuous emulsion according to claim 12 wherein the emulsifier is a monoglyceride of a saturated, unsaturated or mixtures of saturated and unsaturated $C_{16}$-$C_{18}$ fatty acids.

* * * * *